(12) United States Patent
Inaba

(10) Patent No.: US 10,866,781 B2
(45) Date of Patent: Dec. 15, 2020

(54) INFORMATION PROCESSOR

(71) Applicant: TOYOTA JIDOSHA KABUSHIKI KAISHA, Toyota (JP)

(72) Inventor: Chihiro Inaba, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 207 days.

(21) Appl. No.: 16/126,291

(22) Filed: Sep. 10, 2018

(65) Prior Publication Data
US 2019/0171408 A1 Jun. 6, 2019

(30) Foreign Application Priority Data
Dec. 6, 2017 (JP) ................................ 2017-234552

(51) Int. Cl.
| | | |
|---|---|---|
| G06F 3/16 | (2006.01) | |
| H04L 29/08 | (2006.01) | |
| G06Q 30/02 | (2012.01) | |
| G06F 16/34 | (2019.01) | |
| G10L 15/08 | (2006.01) | |
| G06K 9/00 | (2006.01) | |
| G06F 16/951 | (2019.01) | |

(52) U.S. Cl.
CPC .............. *G06F 3/16* (2013.01); *G06F 16/345* (2019.01); *G06Q 30/02* (2013.01); *G06Q 30/0265* (2013.01); *G06Q 30/0269* (2013.01); *H04L 67/18* (2013.01); *H04L 67/306* (2013.01); *G06F 16/951* (2019.01); *G06K 9/00832* (2013.01); *G06K 9/00838* (2013.01); *G10L 15/08* (2013.01); *G10L 2015/088* (2013.01)

(58) Field of Classification Search
CPC ......... G10L 15/26; G04L 67/06; G06Q 40/06; B42C 19/06; G06F 3/16
See application file for complete search history.

(56) References Cited

U.S. PATENT DOCUMENTS

| | | | | |
|---|---|---|---|---|
| 2007/0124057 A1* | 5/2007 | Prieto | ..................... | G10L 15/26 701/532 |
| 2009/0271718 A1* | 10/2009 | Balaishis | ............... | G06Q 40/06 715/760 |
| 2017/0048664 A1* | 2/2017 | Zhang | ..................... | H04L 67/22 |
| 2017/0301254 A1* | 10/2017 | Andres | ................... | B42C 19/06 |

FOREIGN PATENT DOCUMENTS

JP 2010-032763 A 2/2010

* cited by examiner

*Primary Examiner* — Etienne P Leroux
(74) *Attorney, Agent, or Firm* — Oliff PLC

(57) ABSTRACT

An information processor includes a keyword acquisition section configured to acquire a keyword; a first acquisition section configured to acquire information on a description of the acquired keyword from a database; a summary creating section configured to summarize the description to create a summary; an extracting section configured to extract, from the description, at least one element that is not contained in the summary; an output section configured to output the at least one element that is not contained in the summary to a user, and to output the summary to the user after outputting the at least one element that is not contained in the summary to the user; and a profile creating section configured to create a user profile of the user in accordance with an input indicative of an interest of the user.

5 Claims, 3 Drawing Sheets

INFORMATION PROCESSOR

INCORPORATION BY REFERENCE

The disclosure of Japanese Patent Application No. 2017-234552 filed on Dec. 6, 2017 including the specification, drawings and abstract is incorporated herein by reference in its entirety.

BACKGROUND

1. Technical Field

The disclosure relates to an information processor that creates a user profile.

2. Description of Related Art

A language learning support system has been known. The language learning support system recognizes the speech of a user, and records history information on the user's speech. When receiving the speech including language knowledge that has never been used by the user, the language learning support system provides the user with a description including a meaning and like of the speech on the basis of the history information (for example, see Japanese Patent Application Publication No. 2010-32763 A (JP 2010-32763 A)).

SUMMARY

It has been desired to collect the user's interests on the basis of the user's speech and the like and to create a user profile to provide services and distributing advertisements.

The disclosure provides an information processor that creates a user profile that reflects user's wide-ranging interests.

An aspect of the disclosure relates to an information processor including a keyword acquisition section configured to acquire a keyword; a first acquisition section configured to acquire information on a description of the acquired keyword, from a database; a summary creating section configured to summarize the description to create a summary; an extracting section configured to extract, from the description, at least one element that is not contained in the summary; an output section configured to output the at least one element that is not contained in the summary to a user, and to output the summary to the user after outputting the at least one element that is not contained in the summary to the user; and a profile creating section configured to create a user profile of the user in accordance with an input indicative of an interest of the user.

According to this aspect, the summary is created from the description of the keyword. The summary is output to the user after the at least one element that is not contained in the summary is output to the user. The user profile is created in accordance with the input indicative of the interest of the user. Thus, the user profile that reflects the user's deeper interest can be created with the use of the spontaneous input of the user. In addition, the user's interest can be acquired on the basis of wide-ranging topics generated from the at least one element that is not contained in the summary. Thus, the user profile that reflects the user's wide-ranging interests can be created.

The keyword acquisition section may be configured to acquire the keyword related to a current position of the user.

The user may be at least one occupant of a vehicle; the information processor may further include a second acquisition section configured to acquire the number of the at least one occupant of the vehicle; and a condition, under which the output section starts outputting the at least one element that is not contained in the summary, may vary depending on the number of the at least one occupant acquired by the second acquisition section.

The information processor may further include a third acquisition section configured to acquire a conversation frequency of the at least one occupant of the vehicle. In a case where the acquired number of the at least one occupant is two or more, the output section may start outputting the at least one element that is not contained in the summary after the acquired conversation frequency becomes lower than a specified frequency.

In a case where the acquired number of the at least one occupant is one, the output section may start outputting the at least one element that is not contained in the summary after the keyword is acquired.

According to the above-described aspect of the disclosure, the user profile that reflects the user's wide-ranging interests can be created.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
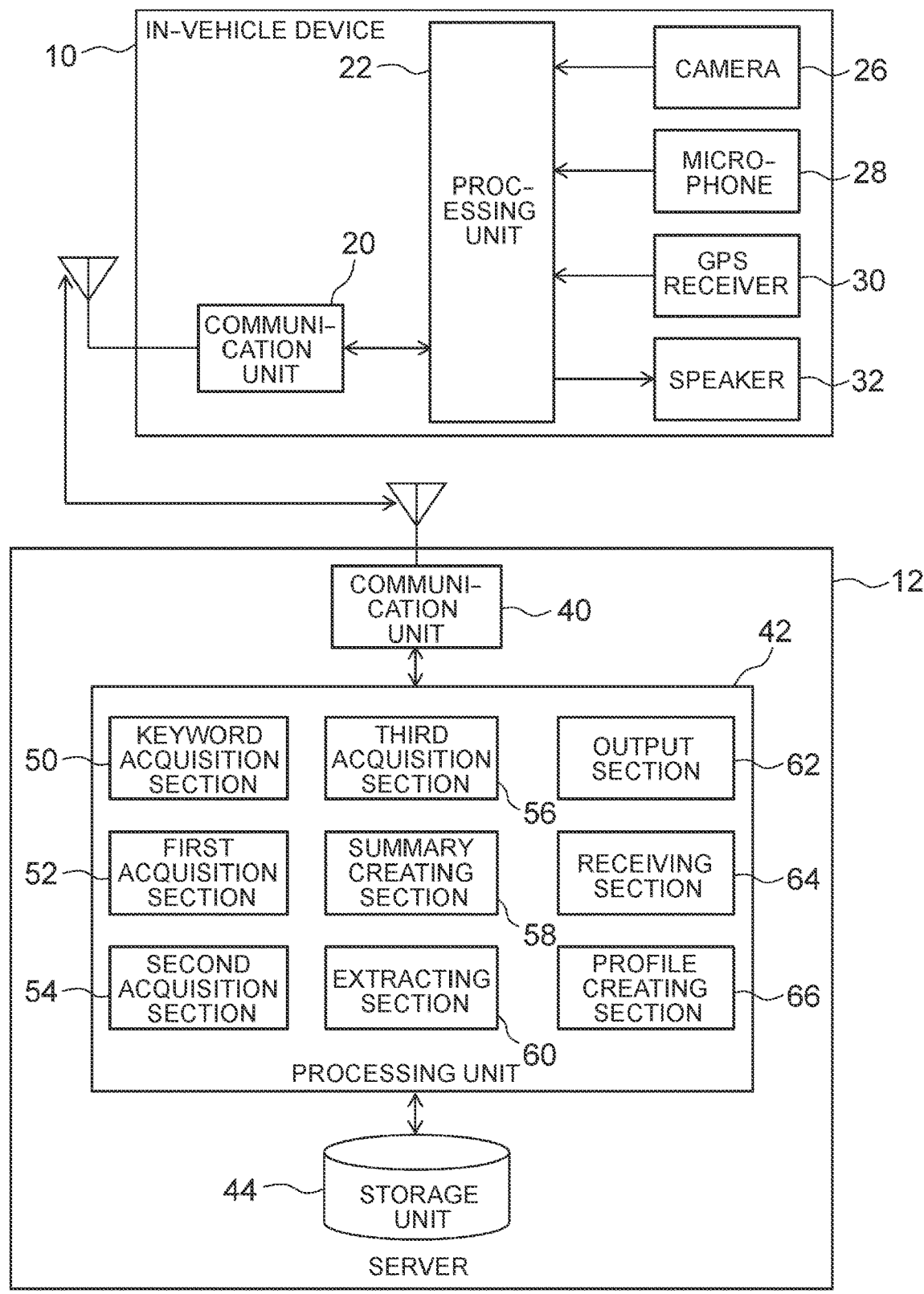
FIG. 1 is a block diagram of a configuration of an information processing system according to an embodiment.

FIG. 1 is a block diagram of a configuration of an information processing system 1 according to an embodiment. The information processing system 1 includes an in-vehicle device 10 and a server 12. FIG. 1 shows one in-vehicle device 10 for clarification of the description. However, the information processing system 1 may include a plurality of the in-vehicle devices 10. The information processing system 1 may be also referred to as an information-providing agent system.

The in-vehicle device 10 is mounted on a vehicle (e.g., an automobile). The in-vehicle device 10 communicates with the server 12 wirelessly. Although a standard of the wireless communication is not particularly limited, examples of the standard include the third generation mobile telecommunication system (3G), the fourth generation mobile telecommunication system (4G), and the fifth generation mobile telecommunication system (5G). The in-vehicle device 10 may communicate with the server 12 wirelessly via a base station that is not shown. The server 12 is installed, for example, in a data center, and functions as an information processor that processes information transmitted from the in-vehicle device 10.

The in-vehicle device 10 includes a communication unit 20, a processing unit 22, a camera 26, a microphone 28, a GPS receiver 30, and a speaker 32.

The camera 26 is provided in a cabin of the vehicle (i.e., a vehicle cabin) and captures an image of an occupant in the vehicle cabin. The camera 26 outputs the captured image data to the processing unit 22.

The microphone 28 is provided in the vehicle cabin and acquires voice in the vehicle cabin. The microphone 28 outputs the acquired voice data to the processing unit 22.

The GPS receiver 30 derives a current position of the vehicle by receiving a signal from a GPS satellite. The current position of the vehicle is substantially the same as a current position of the user, that is, at least one occupant of the vehicle (i.e., at least one vehicle occupant). The current position includes latitude and longitude. The GPS receiver 30 outputs the user's current position information (i.e., information on the current position of the user) to the processing unit 22. The processing unit 22 outputs the user's current position information to the communication unit 20.

The processing unit 22 recognizes the image of the inside of the vehicle cabin, which is captured by the camera 26, and derives the number of the vehicle occupants on the basis of, for example, the number of faces of the occupants acquired by the image recognition. The processing unit 22 outputs the derived number of the occupants to the communication unit 20.

The processing unit 22 derives a conversation frequency of the vehicle occupants on the basis of the voice in the vehicle cabin, which is acquired by the microphone 28. The processing unit 22 also recognizes the speeches (i.e., utterances) of the occupants on the basis of the voice in the vehicle cabin, which is acquired by the microphone 28. The processing unit 22 outputs the derived conversation frequency of the occupants and the voice recognition result to the communication unit 20.

The communication unit 20 communicates with the server 12. The communication unit 20 periodically transmits the number of the occupants, the conversation frequency of the occupants, the voice recognition result, and the user's current position information to the server 12. Information used to identify the user is attached to each kind of information described above. A transmission frequency of each kind of information may be appropriately determined by an experiment or the like. A transmission frequency of one kind of information may differ from a transmission frequency of another kind of information.

The server 12 includes a communication unit 40, a processing unit 42, and a storage unit 44. The processing unit 42 includes a keyword acquisition section 50, a first acquisition section 52, a second acquisition section 54, a third acquisition section 56, a summary creating section 58, an extracting section 60, an output section 62, a receiving section 64, and a profile creating section 66. The server 12 executes the following processing for each user.

The communication unit 40 communicates with the communication unit 20 of the in-vehicle device 10. The communication unit 40 periodically receives the number of the occupants, the conversation frequency of the occupants, the voice recognition result, and the user's current position information from the in-vehicle device 10.

The keyword acquisition section 50 acquires keywords contained in the occupant speech on the basis of the voice recognition result received by the communication unit 40. The keyword acquisition section 50 also acquires keywords related to the user's current position, which is received by the communication unit 40, on the basis of map information stored in the storage unit 44. The keyword related to the current position is, for example, a geographical name. For example, in the case where the user's current position includes the latitude and the longitude of "Takayama" in Hida-Takayama, the keyword acquisition section 50 acquires "Takayama" as the keyword.

The first acquisition section 52 acquires information on a description of the keyword acquired by the keyword acquisition section 50, from a database (not shown) via the Internet. This database includes, for example, an online encyclopedia such as Wikipedia (registered trademark). For example, the description of "Takayama" includes various kinds of information related to an "overview", "geography", "history", "population", "facilities", "economy", and the like.

The summary creating section 58 summarizes the description acquired by the first acquisition section 52 to create a summary. That is, the summary includes key points of the description. As a technique of creating the summary, a known text summarization technology can be used. For example, the summary of the description of "Takayama" may contain contents described in the "overview" of the description and may contain contents described in sections other than the "overview".

The extracting section 60 extracts elements that are not contained in the summary, from the description acquired by the first acquisition section 52. The elements that are not contained in the summary include various kinds of information that are not the key points of the description of the keyword but are related to the keyword. Thus, the elements that are not contained in the summary can be also referred to as profound knowledge. For example, in the description of "Takayama", the elements that are not contained in the summary include the information related to the "geography", the "history", the "population", the "facilities", the "economy", and the like. The extracting section 60 may extract at least one element that is not contained in the summary, from the description acquired by the first acquisition section 52.

The output section 62 creates text from the elements that are not contained in the summary. As a technique of creating the text, a known technique can be used. For example, the elements that are not contained in the summary may be inserted in the text with a specified pattern. The output section 62 outputs the text data containing the elements that are not contained in the summary to the in-vehicle device 10 via the communication unit 40, and then outputs the summary data to the in-vehicle device 10 via the communication unit 40 (i.e., outputs the summary data to the in-vehicle device 10 via the communication unit 40 after outputting the text data containing the elements that are not contained in the summary to the in-vehicle device 10). That is, after output of the elements that are not contained in the summary is completed, the output section 62 outputs the summary at the last stage. When the output section 62 outputs the elements that are not contained in the summary, the output section 62 outputs the elements related to the keyword contained in the user profile, which will be described below, at the last stage. In the in-vehicle device 10, the text data of the elements that are not contained in the summary is received by the communication unit 20, and on the basis of the text data of the elements that are not contained in the summary, the processing unit 22 causes the speaker 32 to output voice reading the text. Then the processing unit 22 causes the speaker 32 to output voice reading the summary on the basis of the summary data. This corresponds to the output of the summary to the user by the output section 62 after the output of the elements that are not contained in the summary to the user by the output section 62.

As described above, the in-vehicle device 10 first speaks about the profound knowledge regarding the keyword, which lacks an essential point (in other words, a key point or core information). That is, the in-vehicle device 10 intentionally makes the speech (i.e., gives a talk) lacking the key point, in order to find the user's interest.

The second acquisition section 54 acquires the number of the vehicle occupants, which is received by the communication unit 40. The third acquisition section 56 acquires the conversation frequency of the vehicle occupants, which is received by the communication unit 40.

A condition, under which the output section 62 starts outputting the elements that are not contained in the summary, varies depending on the number of the occupants acquired by the second acquisition section 54. In the case where the acquired number of the occupants is one, the output section 62 starts outputting the elements that are not contained in the summary after the keyword is acquired and the elements that are not contained in the summary are extracted.

In the case where the acquired number of the occupants is two or more, the output section 62 starts outputting the elements that are not contained in the summary after the conversation frequency acquired by the third acquisition section 56 becomes lower than a specified frequency. In the case where the acquired number of the occupants is two or more, the output section 62 does not start outputting the elements that are not contained in the summary and the keyword acquisition section 50 continues to acquire the keywords contained in the user's speech while the acquired conversation frequency is equal to or higher than the specified frequency. That is, while the conversation made by the occupants is frequent, the elements that are not contained in the summary are not output. Then, when the conversation made by the occupants becomes sparse, the elements that are not contained in the summary are output. The specified frequency can be appropriately determined by an experiment or the like.

While the output section 62 outputs the elements that are not contained in the summary and outputs the summary, the receiving section 64 receives an input indicative of the user's interest or an input indicative of lack of the user's interest via the communication unit 40. The input indicative of the user's interest may be a voice input such as "that is what I wanted to know", "oh", or "a little bit more", or may be the input of a specified button operation. The input indicative of the lack of the user's interest may be a voice input such as "enough", "unnecessary", or "not interested", or may be the input of a specified button operation. The voice input is included in the voice recognition result, which is received by the communication unit 40. Although not shown, the receiving section 64 receives the input of the specified button operation when the user operates an operation section such as a button provided on a steering wheel of the vehicle.

The profile creating section 66 creates the user profile of the user in accordance with the input indicative of the user's interest and stores the created user profile in the storage unit 44. More specifically, at a time point near the time point at which the receiving section 64 receives the input indicative of the user's interest, the profile creating section 66 adds the keyword, which is output from the output section 62, to the user profile. For example, in the case where the input indicative of the user's interest is received immediately after output of "Hida beef (a name of a specialty product)" while the output section 62 outputs the text related to the "economy of Takayama", "Hida beef" is added to the user profile.

The keyword acquisition section 50 newly acquires the keyword that corresponds to the input indicative of the user's interest. More specifically, the keyword acquisition section 50 acquires the keyword that is added to the user profile by the profile creating section 66. Each of the first acquisition section 52, the summary creating section 58, and the extracting section 60 executes the above-described processing on the basis of the newly acquired keyword, and the output section 62 outputs the elements that are not contained in the summary and then outputs the summary on the basis of the newly acquired keyword.

In addition, while the output section 62 outputs the elements that are not contained in the summary, the receiving section 64 receives the input of the user's question including the user's interest via the communication unit 40. It is assumed that the input of the user's question is received when a topic that interests the user is output. For example, in the case where the user is interested in "history", the input of the user's question is a voice input such as "tell me about the history" or "history?" The voice input is included in the voice recognition result, which is received by the communication unit 40.

The profile creating section 66 creates the user profile of the user in accordance with the user's question. More specifically, the profile creating section 66 adds the user's interest contained in the user's question to the user profile. That is, there is a case where the keyword that is not output from the output section 62 is added to the user profile. The keyword acquisition section 50 newly acquires the keyword in accordance with the user's question. More specifically, the keyword acquisition section 50 acquires the user's interest contained in the user's question as the keyword.

For example, in the case where the user's question is "tell me about the history", the profile creating section 66 adds the "history" as the user's interest to the user profile. In this case, the keyword acquisition section 50 newly acquires the "history" as the keyword. With regard to the "history" of "Takayama", the output section 62 outputs the elements that are not contained in the summary and then outputs the summary. That is, also herein, the in-vehicle device 10 first makes the speech about (i.e., speaks about) the profound knowledge lacking the essential point with regard to the information that interests the user.

In the case where the receiving section 64 receives the input indicative of the lack of the user's interest while the elements that are not contained in the summary are output, the output section 62 stops outputting the elements that are not contained in the summary and outputs the summary.

In the case where the receiving section 64 does not receive the input indicative of the user's interest while the summary is output, the keyword acquisition section 50 newly acquires the keyword that is contained in the occupant's speech based on the voice recognition result received by the communication unit 40 or the keyword related to the user's current position received by the communication unit 40. This corresponds to a situation where the user shows no interest in the elements that are not contained in the summary, and the summary. Note that, in the case where the keyword has already been acquired, the keyword acquisition section 50 may not acquire the new keyword. In this case, each of the summary creating section 58 and the extracting section 60 executes the above-described processing on the basis of the already acquired keyword, and the output section 62 outputs the elements that are not contained in the summary and then outputs the summary on the basis of the already acquired keyword.

The processing unit 42 provides services, distributes advertisements, and provides points of interest (POI) recommendations to the in-vehicle device 10 in the user's vehicle by using the generated user profile.

This configuration is realized by a central processing unit (CPU), memory, and another large-scale integrated circuit (LSI) of any given computer in terms of hardware, and is realized by a program loaded to the memory, or the like in terms of software. The functional blocks that are realized by coordinating those components are provided herein. Thus, it is understood by the person skilled in the art that the functional blocks can be realized in various modes by the hardware only, the software only, or a combination of those.

Figure 2:
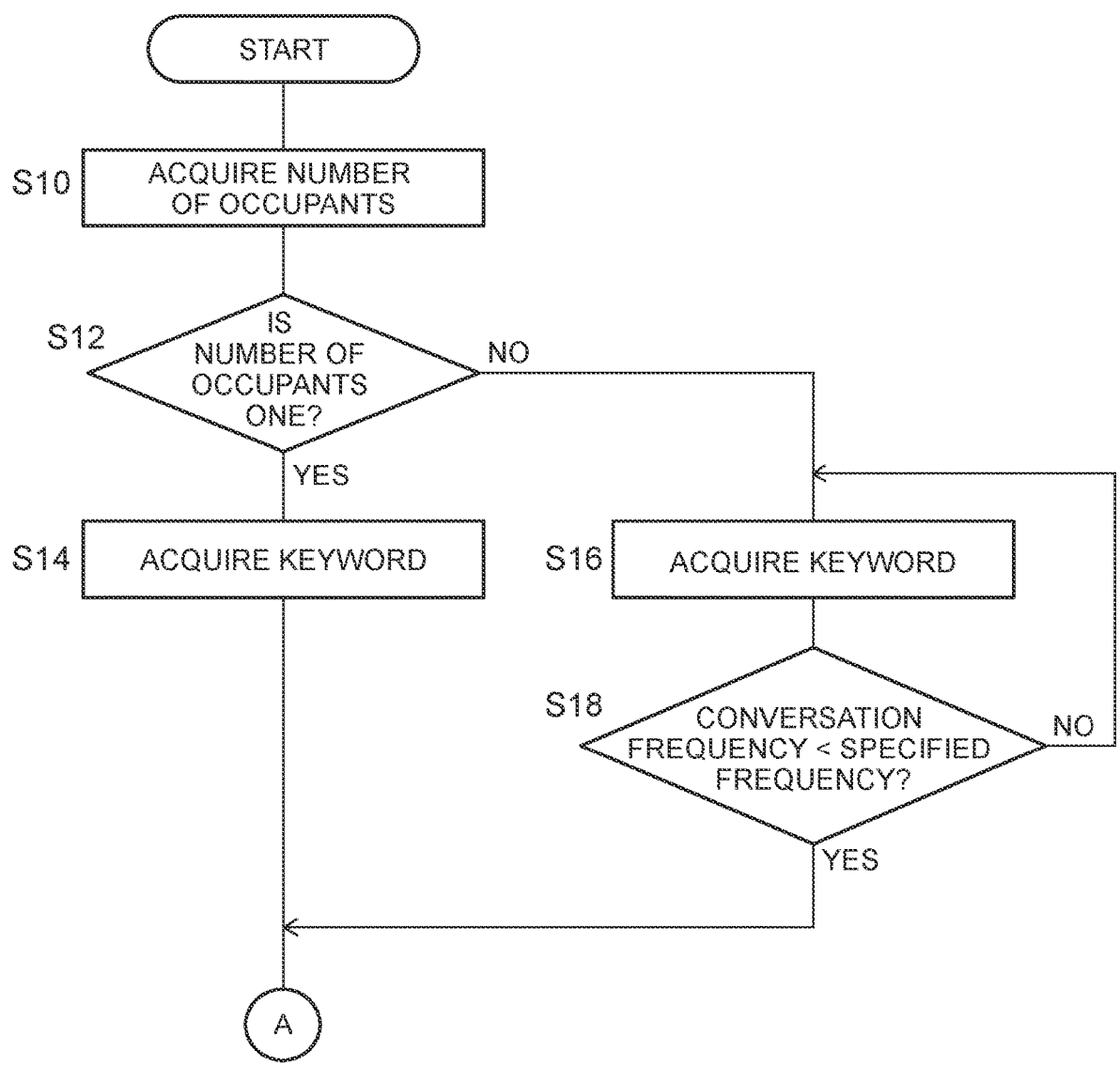
FIG. 2 shows a flowchart of processing executed in a server in FIG. 1.
Figure 3:
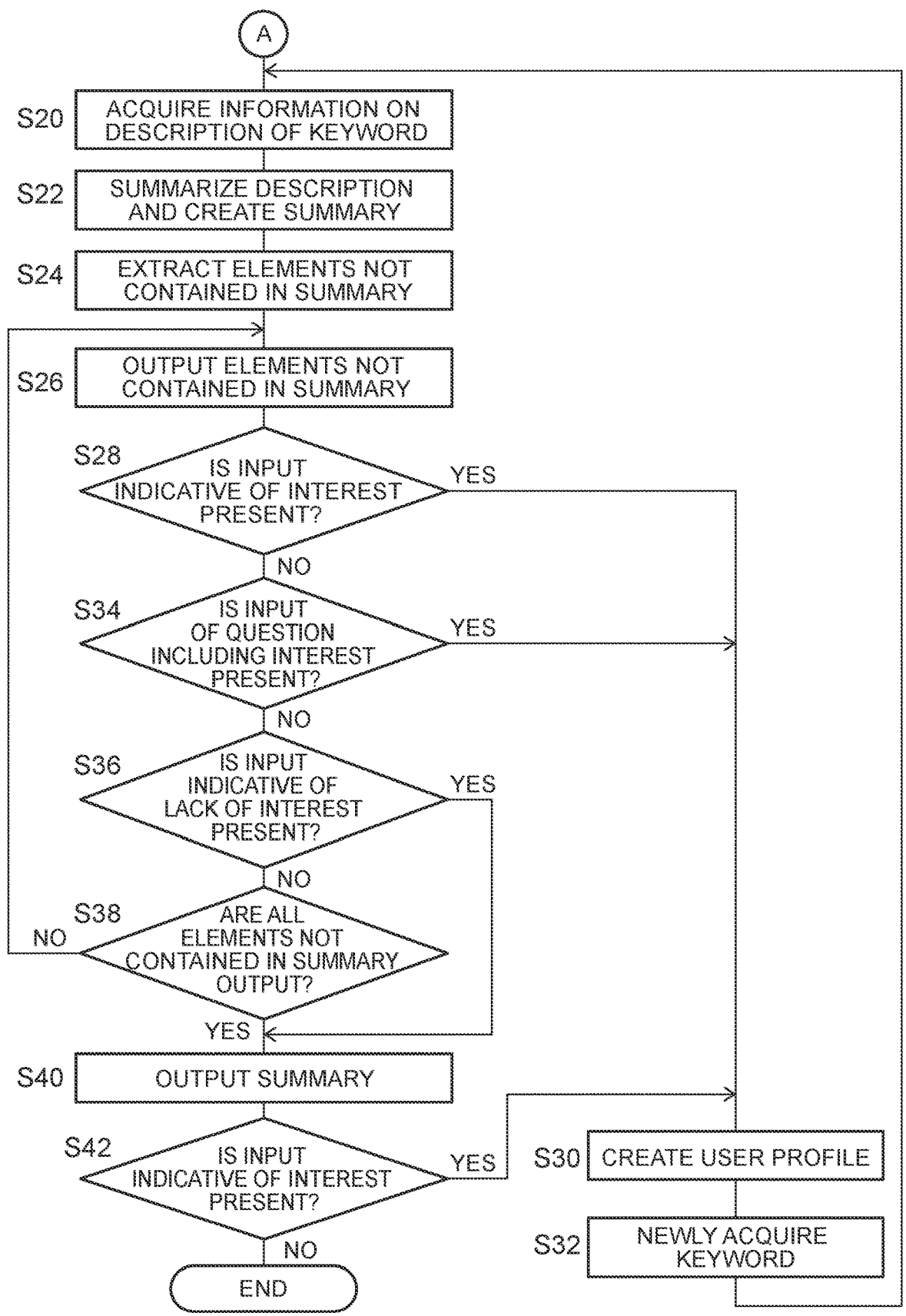
FIG. 3 shows the flowchart of the processing executed in the server in FIG. 1.

Next, a description will be provided on an overall operation of the information processing system 1 that has the configuration described so far. FIG. 2 and FIG. 3 are a flowchart of the processing executed in the server 12 of FIG. 1. This processing is executed periodically.

In FIG. 2, the second acquisition section 54 acquires the number of the vehicle occupants (S10). When the number of the occupants is one (YES in S12), the keyword acquisition section 50 acquires the keyword on the basis of the voice recognition result or the user's current position (S14), and the processing proceeds to S20 in FIG. 3. When the number of the occupants is two or more (NO in S12), the keyword acquisition section 50 acquires the keyword on the basis of the voice recognition result or the user's current position (S16). Then, when the conversation frequency of the occupants is lower than the specified frequency (YES in S18), the processing proceeds to S20 in FIG. 3. When the conversation frequency of the occupants is equal to or higher than the specified frequency (NO in S18), the processing returns to S16.

Referring to FIG. 3, the first acquisition section 52 acquires the information on the description of the acquired keyword from the database (S20). The summary creating section 58 summarizes the acquired description and creates the summary (S22). The extracting section 60 extracts the elements that are not contained in the summary, from the acquired description (S24). The output section 62 outputs at least one of the elements that are not contained in the summary (S26).

When the input indicative of the user's interest is received (YES in S28), the profile creating section 66 creates the user profile of the user in accordance with the input indicative of the user's interest or the user's question (S30), and the keyword acquisition section 50 newly acquires the keyword in accordance with the input indicative of the user's interest or the user's question (S32). Then, the processing returns to S20.

When the input indicative of the user's interest is not received (NO in S28) and the input of the user's question including the user's interest is received (YES in S34), the processing proceeds to S30. When the input of the user's question including the user's interest is not received (NO in S34) and the input indicative of the lack of the user's interest is received (YES in S36), the processing proceeds to S40 described below. When the input indicative of the lack of the user's interest is not received (NO in S36) and at least one of the element that are not contained in the summary is not output (NO in S38), the processing returns to S26. When all of the elements that are not contained in the summary are output (YES in S38), the output section 62 outputs the summary (S40). Then, when the input indicative of the user's interest is received (YES in S42), the processing proceeds to S30. When the input indicative of the user's interest is not received (NO in S42), the processing is ended. By repeatedly executing such processing, the user profile contains a plurality of keywords that interest the user.

As described above, according to this embodiment, the summary is created from the description of the keyword. The summary is output to the user after the elements that are not contained in the summary are output to the user. The user profile is created in accordance with the input indicative of the user's interest. Thus, the user profile that reflects the user's deeper interest can be created with the use of the spontaneous input of the user. In addition, the user's interest can be acquired on the basis of the wide-ranging topics that are generated from the elements that are not contained in the summary. Thus, the user profile that reflects the user's wide-ranging interests can be created.

Since the keyword related to the user's current position is acquired, it is possible to output the elements that are not contained in the summary and that may interest the user, and to output the summary that may interest the user.

Since the condition under which the output of the elements that are not contained in the summary is started varies in accordance with the acquired number of the vehicle occupants, the user's interest can be appropriately acquired in accordance with the situation in the vehicle. In the case where the acquired number of the occupants is two or more, the output of the elements that are not contained in the summary is started after the acquired conversation frequency becomes lower than the specified frequency. Thus, the user's interest can be acquired without interrupting the conversation of the occupants. In the case where the acquired number of the occupants is one, the output of the elements that are not contained in the summary is started after the keyword is acquired. Thus, the user's interest can be acquired in an interactive manner (i.e., through interaction with the occupant).

Since the keyword is newly acquired in accordance with the input indicative of the user's interest or the user's question, the user can spontaneously narrow down the information. Thus, it is possible to create the user profile that reflects the user's further wide-ranging and deeper interests.

In the case where the output section 62 outputs the elements that are not contained in the summary, the output section 62 outputs the elements related to the keyword contained in the user profile at the last stage. Thus, a possibility of acquiring the user's new interest can be increased.

In the case where the receiving section 64 receives the input indicative of the lack of the user's interest while the elements that are not contained in the summary are output, the output section 62 stops outputting the elements that are not contained in the summary and outputs the summary. Thus, it is possible to appropriately handle the case where the user shows no interest in the elements that are not contained in the summary.

By using the user profile that is created as described above, it is possible to, for example, provide the services, distribute the advertisements, and provide POI recommendations more effectively.

A comparative example will be described herein. A comparative example technique (i.e., a technique in the comparative example) of asking the user a plurality of questions which are set in advance and include, for example, "what is your favorite meal?", and "what kind of spaghetti do you like?", collecting the user's replies to the questions, and identifying the user's interest from the replies to create the user profile has been known. Such a technique is also referred to as a task-achieving agent. Since the questions are set in advance in this comparative example, the range of topics may not be broadened, and thus it may be difficult to collect the user's wide-ranging interests. In contrast, as described above, the user's further wide-ranging interests can be acquired in this embodiment. In addition, in the comparative example, the user may feel that the plurality of questions are bothersome, and thus the user may stop using the system. In contrast, questions are not provided to the user in this embodiment. Thus, the user can be prevented from feeling bothersome due to the questions.

The embodiment of the disclosure has been described. The embodiment is merely illustrative, and a person skilled in the art will understand that various modifications can be made to a combination of the components and a combination of the processes and that such modifications fall within the scope of the disclosure.

For example, the processing unit 22 of the in-vehicle device 10 may execute the above-described processing that is executed by the processing unit 42 of the server 12. In this case, in the in-vehicle device 10, the processing unit 22 acquires the information on the description of the keyword via the server 12. In this modified example, the degree of freedom of the configuration of the information processing system 1 can be increased.

In addition, the in-vehicle device 10 may be provided as mobile equipment such as a smartphone. In this case, the in-vehicle device 10 outputs the elements that are not contained in the summary in voice or text to the user and then outputs the summary in voice or text to the user. The in-vehicle device 10 may be provided as stationary equipment disposed in the vehicle cabin or the like. In this modified example, the user profile can be created by the in-vehicle device 10, and/or any of various kinds of equipment.

What is claimed is:

1. An information processing apparatus comprising:
a processor programmed to:
   acquire a keyword;
   acquire information on a description of the acquired keyword, from a database;
   summarize the description to create a summary;
   extract, from the description, at least one piece of information that is not contained in the summary;
   output the at least one piece of information that is not contained in the summary to a user, and to output the summary to the user after outputting the at least one piece of information that is not contained in the summary to the user; and
   create a user profile of the user in accordance with at least one of an input indicative of an interest of the user received while the at least one piece of information that is not contained in the summary is being output to the user, or an input indicative of the interest of the user received after the summary is output.

2. The information processing apparatus according to claim 1, wherein the processor is programmed to acquire the keyword related to a current position of the user.

3. An information processing apparatus comprising:
a processor programmed to:
   acquire a keyword;
   acquire information on a description of the acquired keyword, from a database;
   summarize the description to create a summary;
   extract, from the description, at least one piece of information that is not contained in the summary;
   output the at least one piece of information that is not contained in the summary to a user, and to output the summary to the user after outputting the at least one piece of information that is not contained in the summary to the user; and
   create a user profile of the user in accordance with an input indicative of an interest of the user,
wherein the user is at least one occupant of a vehicle;
the processor is further programmed to acquire a number of the at least one occupant of the vehicle; and
a condition, under which the processor starts outputting the at least one piece of information that is not contained in the summary, varies depending on the number of the at least one occupant acquired by the processor.

4. The information processing apparatus according to claim 3, wherein:
the processor is programmed to acquire a conversation frequency of the at least one occupant of the vehicle, and
in a case where the acquired number of the at least one occupant is two or more, the processor starts outputting the at least one piece of information that is not contained in the summary after the acquired conversation frequency becomes lower than a specified frequency.

5. The information processing apparatus according to claim 3, wherein in a case where the acquired number of the at least one occupant is one, the processor starts outputting the at least one piece of information that is not contained in the summary after the keyword is acquired.

* * * * *